(12) United States Patent
An et al.

(10) Patent No.: US 11,858,553 B2
(45) Date of Patent: Jan. 2, 2024

(54) REAR VEHICLE BODY STRUCTURE

(71) Applicants: HYUNDAI MOTOR COMPANY, Seoul (KR); Kia Corporation, Seoul (KR)

(72) Inventors: Byeongdo An, Anyang-si (KR); Mun Soo Cha, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 59 days.

(21) Appl. No.: 17/528,560

(22) Filed: Nov. 17, 2021

(65) Prior Publication Data

US 2023/0059635 A1 Feb. 23, 2023

(30) Foreign Application Priority Data

Aug. 18, 2021 (KR) .................. 10-2021-0108618

(51) Int. Cl.
  *B62D 25/08* (2006.01)
  *B62D 27/02* (2006.01)
(52) U.S. Cl.
  CPC ............. *B62D 25/08* (2013.01); *B62D 27/02* (2013.01); *B62D 27/023* (2013.01)

(58) Field of Classification Search
  CPC ............... B62D 25/08; B62D 25/2027; B62D 25/2036; B62D 27/023
  USPC .... 280/124.151, 179; 296/203.01, 4, 29, 30, 296/198, 24
  See application file for complete search history.

(56) References Cited

U.S. PATENT DOCUMENTS

| | | | |
|---|---|---|---|
| 6,234,568 B1 * | 5/2001 | Aoki ..................... | B62D 29/008 296/205 |
| 7,364,225 B2 * | 4/2008 | Tomioka ................ | B62D 25/02 296/203.04 |
| 7,427,098 B2 * | 9/2008 | Kobayashi ........... | B62D 25/088 296/203.04 |
| 11,577,787 B2 * | 2/2023 | Kubota .................. | B62D 25/02 |

FOREIGN PATENT DOCUMENTS

| | | | | |
|---|---|---|---|---|
| CN | 109204549 A | * | 1/2019 | ............. B60R 19/18 |
| JP | 6287722 B2 | * | 3/2018 | |

* cited by examiner

*Primary Examiner* — Dennis H Pedder
(74) *Attorney, Agent, or Firm* — MORGAN, LEWIS & BOCKIUS LLP (57) ABSTRACT

A rear vehicle body structure includes two opposite rear side members to which wheelhouse panels are respectively coupled and spring seats positioned respectively at lower sides of the two opposite rear side members.

15 Claims, 9 Drawing Sheets

REAR VEHICLE BODY STRUCTURE

CROSS-REFERENCE TO RELATED APPLICATION

This application claims priority to and the benefit of Korean Patent Application No. 10-2021-0108618 filed in the Korean Intellectual Property Office on Aug. 18, 2021, the entire contents of which are incorporated herein by reference.

TECHNICAL FIELD

An embodiment of the present disclosure relates to a rear vehicle body structure, and more particularly, to a structure for assembling a spring seat configured to support a spring of a rear suspension.

BACKGROUND

A structure for coping with a reduction in weight of a vehicle body is emphasized as a solution for improving fuel economy of a vehicle. Therefore, the development has been actively conducted on a vehicle body structure capable of improving strength and rigidity and implementing a reduction in weight while satisfying regulations that have become strict in vehicle industries.

In general, a rear vehicle body has two opposite rear side members extending in a longitudinal direction of the vehicle and disposed at two opposite left and right sides in a width direction of the vehicle.

Spring seat assemblies to which rear suspension springs are fixed are mounted on the two opposite rear side members. The spring seat assemblies may support upward and downward loads inputted through the rear suspension springs and transmit the upward and downward loads to two opposite rear wheelhouses.

Because the spring seat assembly does not have a sufficient load path region in an upward/downward direction, there is a likelihood that the upward and downward loads are not smoothly transmitted through the rear suspension springs.

In addition, because separate connection components are required to improve connectivity of the spring seat assembly in the related art, the number of components and the weight and cost of the vehicle body are increased, and there is a limitation in improving coupling rigidity of the spring seat assembly.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a rear vehicle body structure capable of reducing the number of components used to mount a rear suspension spring on a vehicle body and reducing a weight and cost of the vehicle body.

An exemplary embodiment of the present disclosure provides a rear vehicle body structure including: two opposite rear side members to which wheelhouse panels are respectively coupled; and spring seats positioned respectively at lower sides of the two opposite rear side members, in which the two opposite rear side members each include one or more vertical ribs disposed in each of the two opposite rear side members in a longitudinal direction.

In the rear vehicle body structure according to the exemplary embodiment of the present disclosure, the spring seat may include an aluminum die-cast member.

In addition, in the rear vehicle body structure according to the exemplary embodiment of the present disclosure, the spring seat coupled to a respective one of the two opposite rear side members may include: a spring mounting part coupled to a lower surface of the respective one of the two opposite rear side members; and a rib reinforcing part coupled to an outer surface of the respective one of the two opposite rear side members.

In addition, in the rear vehicle body structure according to the exemplary embodiment of the present disclosure, the spring mounting part may include: a spring support surface configured to be in close contact with a lower surface of the respective one of the two opposite rear side members; and one or more fastening ribs extending outward from an edge of the spring support surface and fastened to a lower surface of the respective one of the two opposite rear side members.

In addition, in the rear vehicle body structure according to the exemplary embodiment of the present disclosure, the fastening rib may be provided in plural.

In addition, in the rear vehicle body structure according to the exemplary embodiment of the present disclosure, the plurality of fastening ribs may be disposed radially at the edge of the spring support surface.

In addition, in the rear vehicle body structure according to the exemplary embodiment of the present disclosure, the spring mounting part may further include a spring fixing boss having a conical shape and formed at a lower side of the spring support surface.

In addition, in the rear vehicle body structure according to the exemplary embodiment of the present disclosure, the rib reinforcing part may include: a fastening surface coupled to an outer surface of the respective one of the two opposite rear side members; and a box rib integrally connected to the fastening surface and having a box space opened at an upper end thereof.

In addition, in the rear vehicle body structure according to the exemplary embodiment of the present disclosure, the rib reinforcing part may further include one or more inner ribs integrally connected to the box rib in the box space.

In addition, in the rear vehicle body structure according to the exemplary embodiment of the present disclosure, the one or more inner ribs may each extend in a direction perpendicular to the fastening surface, be integrally connected to the box rib, and be disposed in an upward/downward direction.

In addition, the rear vehicle body structure according to the exemplary embodiment of the present disclosure may further include an outer reinforcing member connected to the spring seat and coupled to an outer surface of a respective one of the wheelhouse panels and an outer surface of the respective one of the two opposite rear side members.

In addition, the rear vehicle body structure according to the exemplary embodiment of the present disclosure may further include an inner reinforcing member configured to correspond to the outer reinforcing member and coupled to an inner surface of the respective one of the wheelhouse panels and an upper surface of the respective one of the two opposite rear side members.

In addition, in the rear vehicle body structure according to the exemplary embodiment of the present disclosure, the spring seat may be configured to transmit upward and downward loads to the respective one of the wheelhouse panels through the outer surface of the respective one of the two opposite rear side members.

In addition, in the rear vehicle body structure according to the exemplary embodiment of the present disclosure, the spring seat may be configured to transmit the upward and downward loads to the wheelhouse panel through the one or more vertical ribs and the inner reinforcing member.

In addition, in the rear vehicle body structure according to the exemplary embodiment of the present disclosure, the spring seat may be configured to transmit the upward and downward loads to the wheelhouse panel through the outer reinforcing member.

In addition, in the rear vehicle body structure according to the exemplary embodiment of the present disclosure, the box rib may be connected to an outer reinforcing member coupled to the outer surface of the respective one of the two opposite rear side members.

In addition, in the rear vehicle body structure according to the exemplary embodiment of the present disclosure, the outer reinforcing member may include: a rib coupling portion coupled to the box rib; and one or more reinforcing protrusion portions extending upward and downward from the rib coupling portion.

In addition, in the rear vehicle body structure according to the exemplary embodiment of the present disclosure, the one or more reinforcing protrusion portions may branch off into at least two portions from the rib coupling portion and be disposed in an upward/downward direction.

According to the embodiments of the present disclosure, it is possible to reduce the number of components used to mount the suspension spring on the vehicle body and reduce the weight and cost of the vehicle body.

In addition, according to the embodiments of the present disclosure, it is possible to effectively disperse the upward and downward loads inputted through the suspension spring and easily transmit the upward and downward loads to the wheelhouse panel through the multiple load paths.

Other effects, which may be obtained or expected by the embodiments of the present disclosure, will be directly or implicitly disclosed in the detailed description on the embodiments of the present disclosure. That is, various effects expected according to the embodiments of the present disclosure will be disclosed in the detailed description to be described below.

BRIEF DESCRIPTION OF THE DRAWINGS

The embodiments in the present specification may be better understood with reference to the following description in conjunction with the accompanying drawings in which similar reference numerals indicate the same or functionally similar elements.

It should be understood that the accompanying drawings are not necessarily to scale, but provide a somewhat simplified representation of various preferred features that exemplify the basic principles of the present disclosure. For example, specific design features of the present disclosure, including particular dimensions, directions, positions, and shapes, will be partially determined by the particularly intended application and use environment.

DETAILED DESCRIPTION OF THE EMBODIMENTS

The terms used in the present specification are for explaining the exemplary embodiments, not for limiting the present disclosure. The singular expressions used herein are intended to include the plural expressions unless the context clearly dictates otherwise. It is to be understood that the term "comprise (include)" and/or "comprising (including)" used in the present specification means that the features, the integers, the steps, the operations, the constituent elements, and/or component are present, but the presence or addition of one or more of other features, integers, steps, operations, constituent elements, components, and/or groups thereof is not excluded. The term "and/or" used herein includes any one or all the combinations of one or more listed related items. In the present specification, the term 'coupled' means a physical relationship between two components which are connected directly to each other or connected indirectly through one or more intermediate components by welding, a self-piercing rivet (SPR), a flow drill screw (FDS), a bonding agent for a structure, or the like.

The terms 'vehicle', 'for a vehicle', and 'automobile' or the similar terms used in the present specification generally include vehicles (passenger automobiles) including passenger vehicles, sport utility vehicles (SUVs), buses, trucks, and various commercially available vehicles and include hybrid vehicles, electric vehicles, hybrid electric vehicles, hydrogen power vehicles, and other alternative fuel vehicles (e.g., fuel induced from other resources from petroleum).

Hereinafter, embodiments of the present disclosure will be described in detail with reference to the accompanying drawings.

Figure 1:
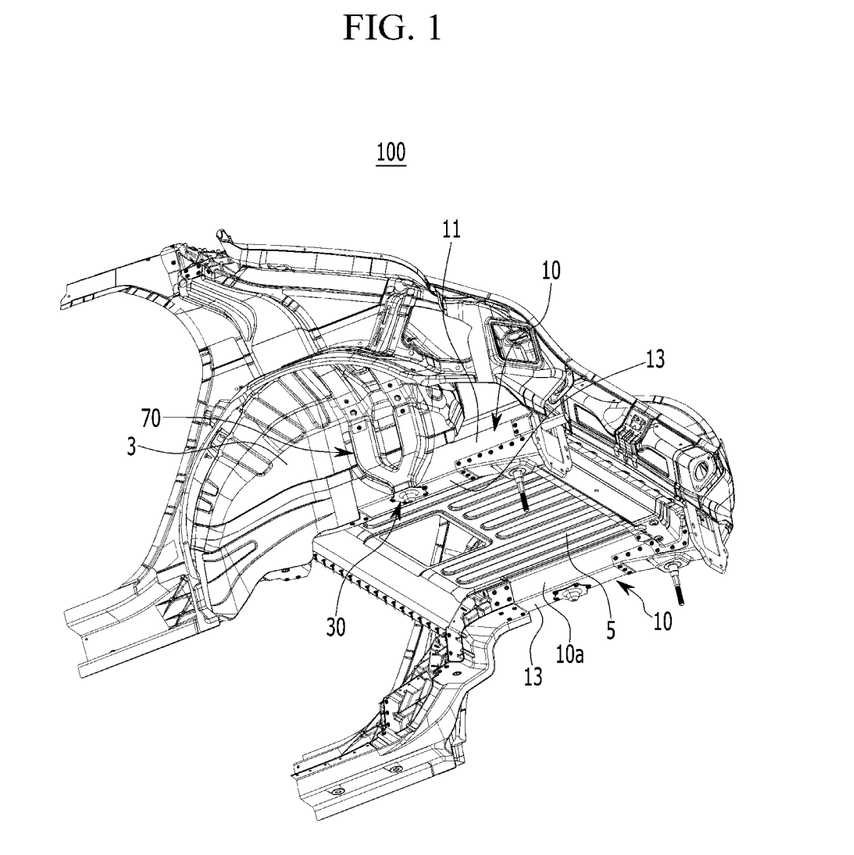
FIGS. 1 and 2 are perspective views illustrating a rear vehicle body structure according to an embodiment of the present disclosure.
Figure 2:
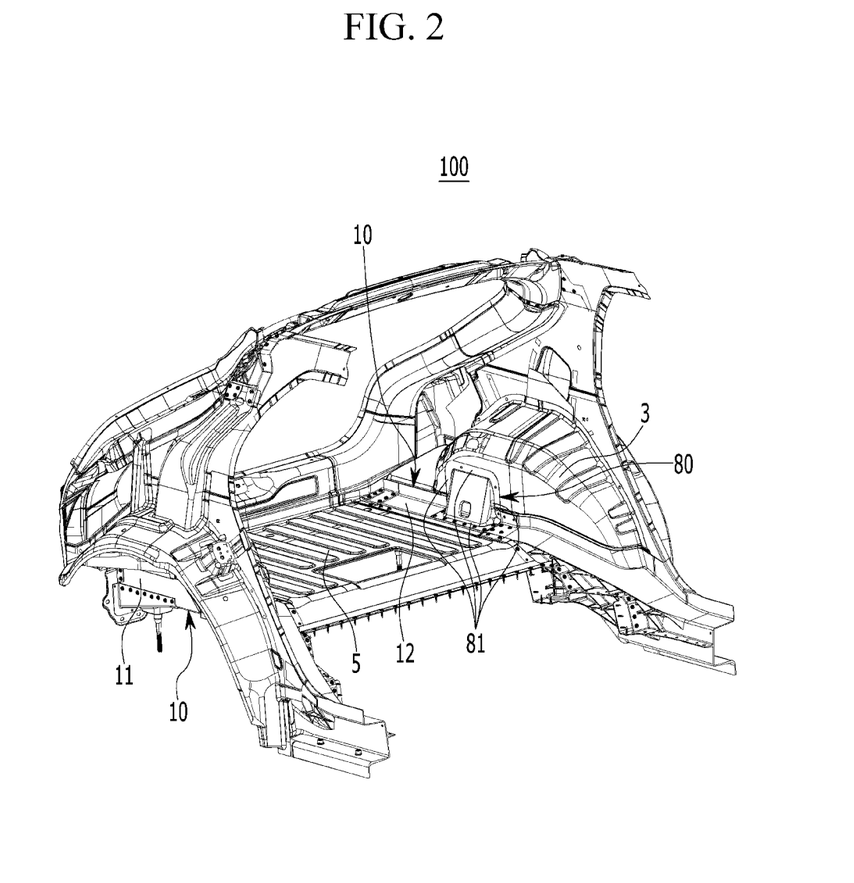
Figure 3:
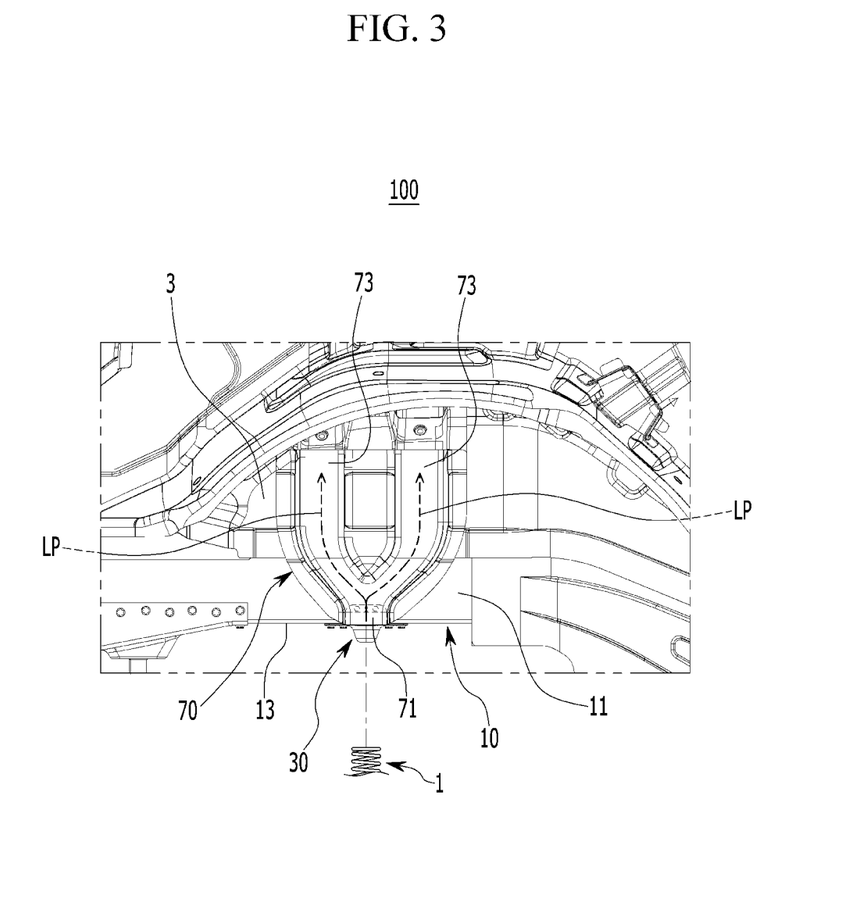
FIG. 3 is an outer side view illustrating the rear vehicle body structure according to the embodiment of the present disclosure.
Figure 4:
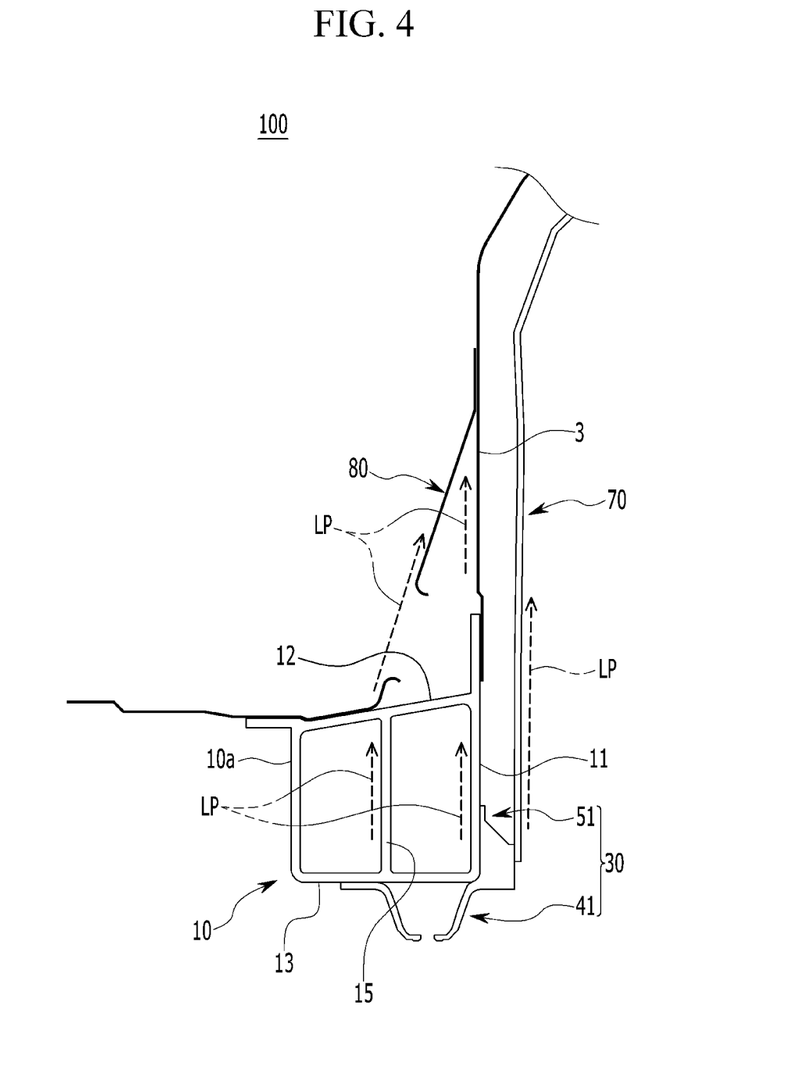
FIG. 4 is a cross-sectional view illustrating the rear vehicle body structure according to the embodiment of the present disclosure.

FIGS. 1 and 2 are perspective views illustrating a rear vehicle body structure according to an embodiment of the present disclosure, FIG. 3 is an outer side view illustrating the rear vehicle body structure according to the embodiment of the present disclosure, and FIG. 4 is a cross-sectional view illustrating the rear vehicle body structure according to the embodiment of the present disclosure.

Referring to FIGS. 1 to 4, a rear vehicle body structure 100 according to an embodiment of the present disclosure may be applied to a rear structural body of a vehicle made by connecting various types of rear structures.

In this case, a rear suspension (not illustrated) well known to those skilled in the art may be mounted on the rear vehicle body structure 100. The rear suspension may support a load, which is inputted to a vehicle body, through a suspension spring 1.

In the present specification, 'a forward/rearward direction' of the vehicle body may be defined as a longitudinal direction of the vehicle body, a 'vehicle width direction' may be defined as a leftward/rightward direction of the vehicle body, and an 'upward/downward direction' may be defined as a height direction of the vehicle body.

In addition, in the present specification, an 'inner side in the vehicle width direction' may be defined as an inner region (e.g., an inner surface) between components facing and spaced apart from each other, and an 'outer side in the vehicle width direction' may be defined as an outer region (e.g., an outer surface) between the components.

In the present specification, the terms 'upper end portion,' 'upper portion', 'upper end' or 'upper surface' of a component means an end portion, a portion, an end, or a surface of the component which is disposed at a relative upper side, and the terms 'lower end portion,' 'lower portion', 'lower end', or 'lower surface' of a component means an end portion, a portion, an end, or a surface of the component which is disposed at a relatively lower side.

In addition, in the present specification, an end (e.g., one end or the other end) of a component means an end of the component in any one direction, and an end portion (e.g., one end portion or the other end portion) of a component means a predetermined portion of the component that includes the end of the component.

The rear vehicle body structure 100 according to the embodiment of the present disclosure has a structure capable of reducing the number of components used to mount the suspension spring 1 and reducing the cost and weight of the vehicle body.

In addition, the embodiment of the present disclosure provides the rear vehicle body structure 100 capable of effectively supporting and dispersing upward and downward loads inputted through the suspension spring 1, improving rigidity at a load input point, and improving performance in transmitting the upward and downward loads.

To this end, the rear vehicle body structure 100 according to the embodiment of the present disclosure basically includes two opposite rear side members 10, spring seats 30, outer reinforcing members 70, and inner reinforcing members 80.

In the embodiment of the present disclosure, the two opposite rear side members 10 extend in THE forward/rearward direction of the vehicle body from a rear portion of the vehicle body and are respectively disposed at two opposite left and right sides in the vehicle width direction. Wheelhouse panels 3 are respectively mounted on the two opposite rear side members 10.

For example, the two opposite rear side members 10 may each have a quadrangular box shape. The two opposite rear side members 10 may each include an inner surface 10a and an outer surface 11 in the vehicle width direction, and an upper surface 12 and a lower surface 13 in the upward/downward direction. In this case, two opposite ends of a rear floor panel 5 are connected to inner surfaces 10a of the two opposite rear side members 10.

As another example, the two opposite rear side members 10 may each be manufactured by an aluminum extrusion process method.

As still another example, the two opposite rear side members 10 include one or more vertical ribs 15 formed inside the two opposite rear side members in the longitudinal direction. The one or more vertical ribs 15 are configured to improve structural rigidity of each of the two opposite rear side members 10. The one or more vertical ribs 15 are vertically connected to the inner surface in the longitudinal direction of the two opposite rear side members 10.

In the embodiment of the present disclosure, the spring seat 30 may support and fix the suspension spring 1 in the upward/downward direction. The spring seat 30 is positioned at a lower side of each of the two opposite rear side members 10. The spring seat 30 may extend along the lower surface 13 and the outer surface 11 of each of the corresponding two opposite rear side members 10 and be coupled to the lower surface 13 and the outer surface 11. For example, the spring seat 30 may be an aluminum die-cast member 31 manufactured by an aluminum die casting process method well known to those skilled in the art.

Hereinafter, the spring seat 30 applied to the rear vehicle body structure 100 according to the embodiment of the present disclosure will be described in detail with reference to FIGS. 1 to 4 and the accompanying drawings.

Figure 5:
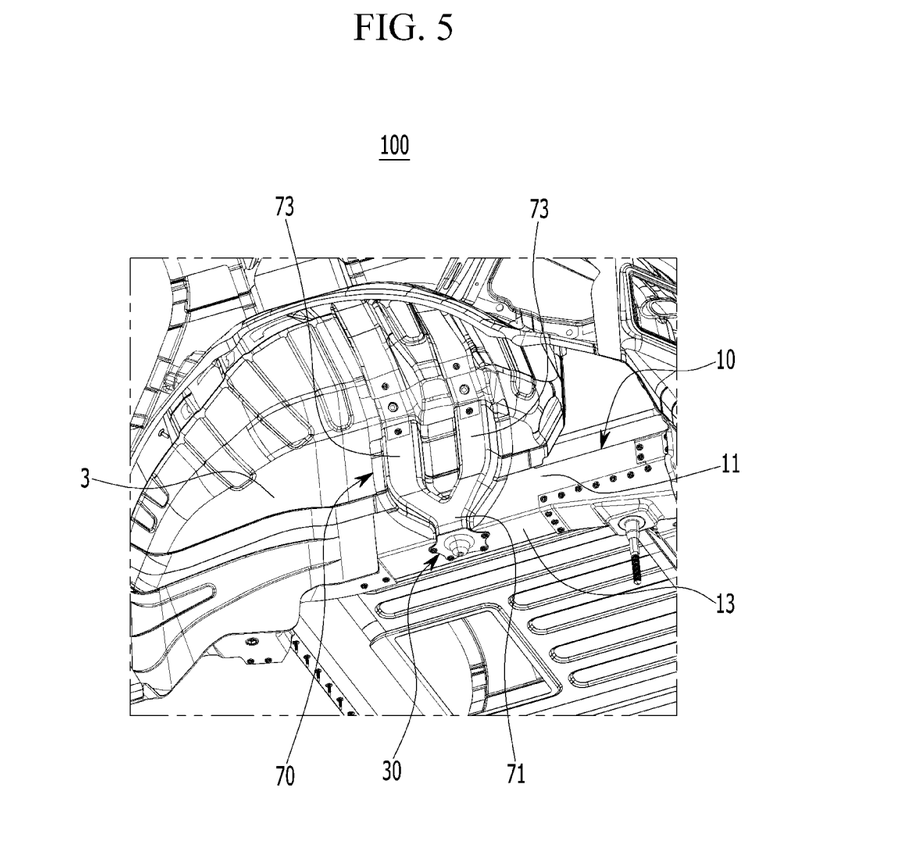
FIGS. 5 and 6 are perspective views illustrating a coupling structure of a spring seat applied to the rear vehicle body structure according to the embodiment of the present disclosure.
Figure 6:
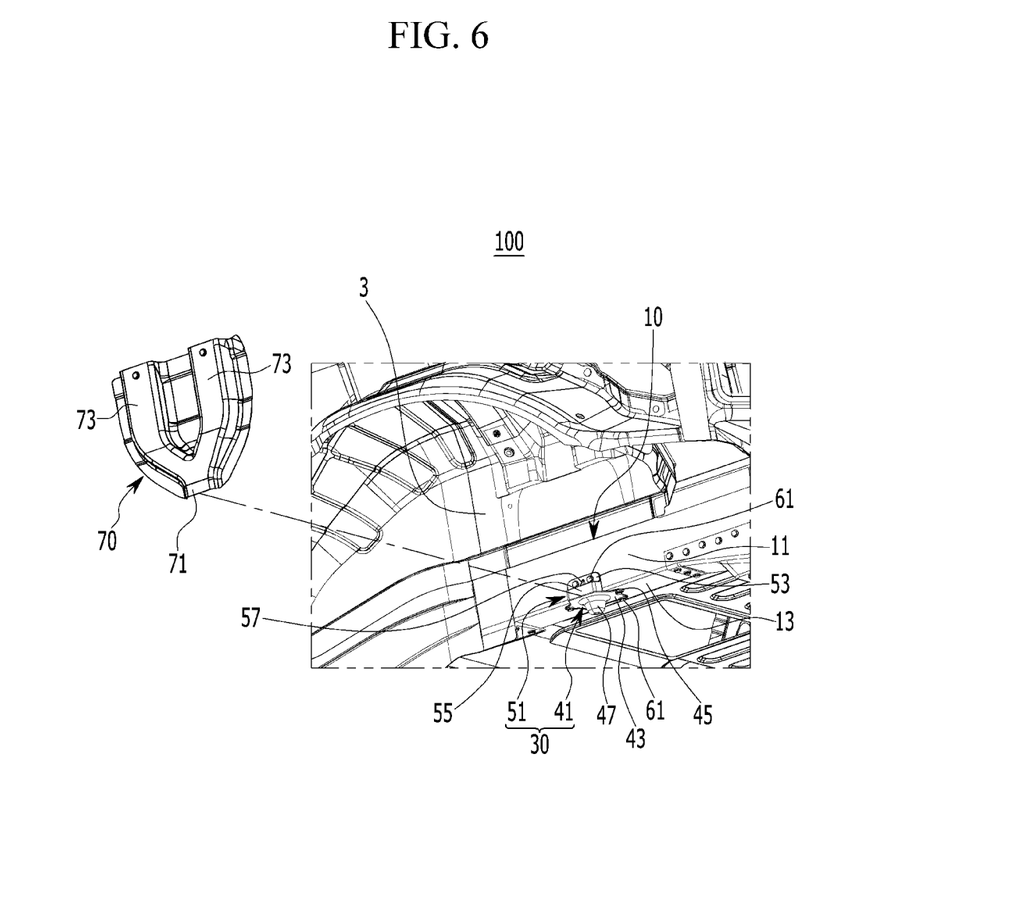
Figure 7:
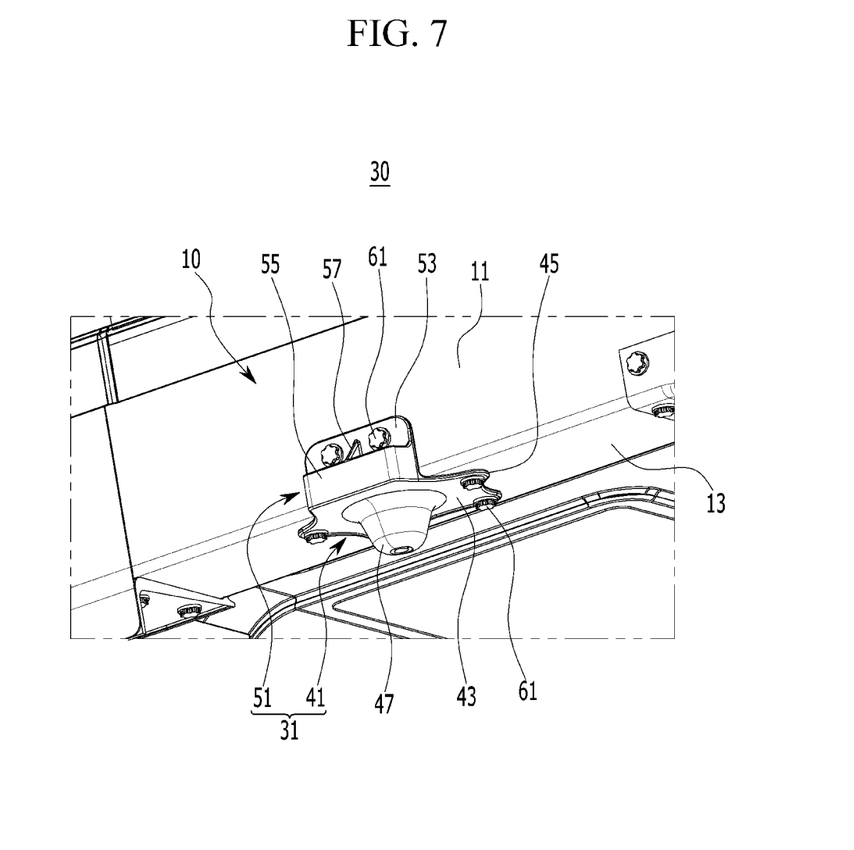
FIGS. 7 to 9 are perspective views illustrating a spring seat part applied to the rear vehicle body structure according to the embodiment of the present disclosure.
Figure 8:
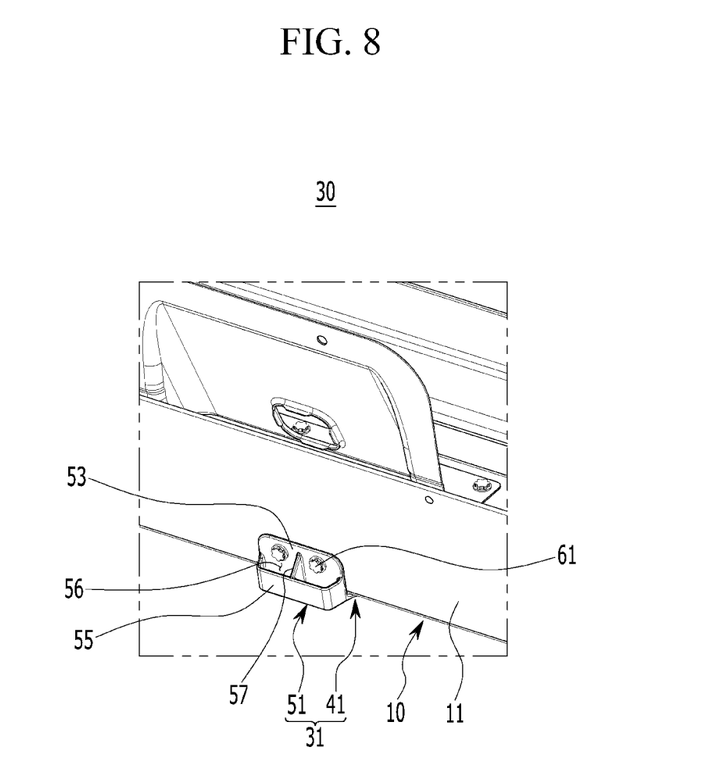
Figure 9:
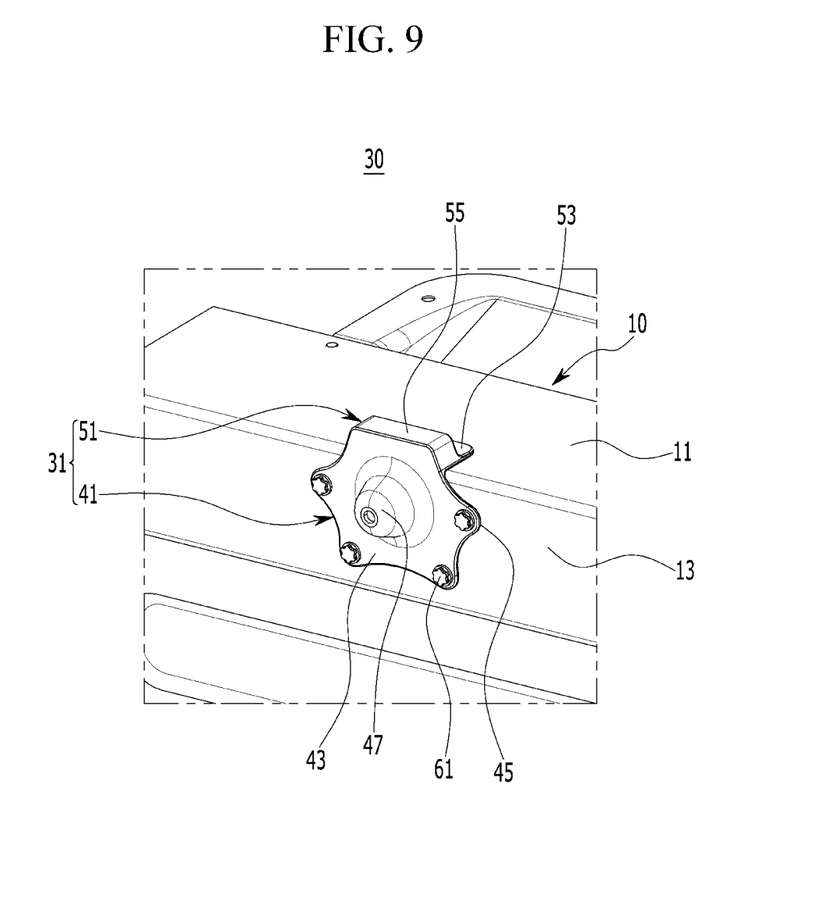

FIGS. 5 and 6 are perspective views illustrating a coupling structure of a spring seat applied to the rear vehicle body structure according to the embodiment of the present disclosure, and FIGS. 7 to 9 are perspective views illustrating a spring seat part applied to the rear vehicle body structure according to the embodiment of the present disclosure.

Referring to FIGS. 1 to 9, the spring seat 30 according to the embodiment of the present disclosure includes a spring mounting part 41 and a rib reinforcing part 51 which are integrally connected to each other.

The spring mounting part 41 supports and fixes the suspension spring 1. The spring mounting part 41 may be coupled to the lower surface 13 of each of the two opposite rear side members 10. The spring mounting part 41 includes a spring support surface 43, one or more fastening ribs 45, and a spring fixing boss 47.

The spring support surface 43 supports an upper end of the suspension spring 1 and is in close contact with the lower surface 13 of each of the two opposite rear side members 10.

The one or more fastening ribs 45 extend outward from an edge of the spring support surface 43 and are fastened to the lower surface 13 of each of the two opposite rear side members 10. For example, the fastening rib 45 may be provided in plural. The plurality of fastening ribs 45 may be disposed radially at the edge of the spring support surface 43.

As another example, the plurality of fastening ribs 45 may be fastened to the lower surface 13 of each of the two opposite rear side members 10 by screws 61. In this case, the screw 61 may be a flow drill screw (FDS) well known to those skilled in the art.

However, the present disclosure is not limited thereto, and the plurality of fastening ribs 45 may be joined to the lower surface 13 of each of the two opposite rear side members 10 by welding, a self-piercing rivet (SPR), a flow drill screw (FDS), a bonding agent for a structure, or the like well known to those skilled in the art.

Further, the spring fixing boss 47 fixes the upper end of the suspension spring 1. The spring fixing boss 47 is formed at a lower side of the spring support surface 43. For example, the spring fixing boss 47 may have a conical shape extending upward and downward from the inside of the edge of the spring support surface 43.

The rib reinforcing part 51 improves rigidity of the spring mounting part 41. The rib reinforcing part 51 is integrally connected to the spring mounting part 41 and coupled to the outer surface of each of the two opposite rear side members 10. The rib reinforcing part 51 may extend upward and downward from the spring mounting part 41 and be coupled to the outer surface 11 of each of the two opposite rear side members 10. The rib reinforcing part 51 includes a fastening surface 53, a box rib 55, and one or more inner ribs 57.

The fastening surface 53 is in close contact with the outer surface 11 of each of the two opposite rear side members 10 and extends in the upward/downward direction (vertical direction) from the spring support surface 43 along the outer surface 11 of each of the two opposite rear side members 10.

For example, the fastening surface 53 may be fastened to the outer surface 11 of each of the two opposite rear side members 10 by the one or more screws 61. In this case, the one or more screws 61 may each be a flow drill screw (FDS).

However, the present disclosure is not limited thereto, and the fastening surface 53 may be joined to the outer surface 11 of each of the two opposite rear side members 10 by welding, a self-piercing rivet (SPR), a flow drill screw (FDS), a bonding agent for a structure, or the like well known to those skilled in the art.

The box rib 55 is integrally connected to the fastening surface 53. The box rib 55 extends outward in the vehicle width direction from the fastening surface 53. The box rib 55 has a box space 56 opened at an upper end thereof. For example, the box space 56 may be a quadrangular box space.

Further, the one or more inner ribs 57 are integrally connected to the box rib 55 in the box space 56. For example, the inner rib 57 extends in a direction perpendicular to the fastening surface 53 and is integrally connected to the box rib 55. The inner rib 57 may be disposed in the upward/downward direction in the box space 56.

Meanwhile, referring to FIGS. 1 to 6, in the embodiment of the present disclosure, the outer reinforcing member 70 improves rigidity of the outer surface of each of the wheelhouse panels 3.

The outer reinforcing member 70 may be coupled to the outer surface of each of the wheelhouse panels 3 and the outer surface 11 of each of the two opposite rear side members 10 and connected to the spring seat 30. The outer reinforcing member 70 may be coupled to the rib reinforcing part 51 and the box rib 55. The outer reinforcing member 70 includes a rib coupling portion 71 and one or more reinforcing protrusion portions 73 which are connected to one another.

The rib coupling portion 71 is coupled to the box rib 55 and has a shape protruding outward in the vehicle width direction from an outer surface of the outer reinforcing member 70.

The one or more reinforcing protrusion portions 73 transmit the upward and downward loads, which are inputted to the two opposite rear side members to the wheelhouse panel 3. The one or more reinforcing protrusion portions 73 extend upward and downward from the rib coupling portion 71. For example, the one or more reinforcing protrusion portions 73 may branch off from the rib coupling portion 71 into at least two portions and may be disposed in the upward/downward direction.

Referring to FIGS. 1 to 6, in the embodiment of the present disclosure, the inner reinforcing member 80 improves rigidity of the inner surface of each of the wheelhouse panels 3 while corresponding to the outer reinforcing member 70.

The inner reinforcing member 80 may correspond to the outer reinforcing member 70 and may be coupled to the inner surface of each of the wheelhouse panels 3 and the upper surface 12 of each of the two opposite rear side members 10.

The inner reinforcing member 80 may be coupled to the inner surface of each of the wheelhouse panel 3 and the upper surface 12 of each of the two opposite rear side members 10 by one or more joint flanges 81 formed at the edge portion.

Hereinafter, an operation of the rear vehicle body structure 100 according to the embodiment of the present disclosure described above will be described in detail with reference to FIGS. 1 to 9.

First, the two opposite rear side members 10 are provided, and the spring seat 30 is provided as the aluminum die-cast member 31 corresponding to each of the two opposite rear side members 10.

The wheelhouse panel 3 is mounted on each of the two opposite rear side members 10. The inner reinforcing member 80 is coupled to the inner surface of each of the wheelhouse panels 3. The inner reinforcing member 80 is coupled to the upper surface 12 of each of the two opposite rear side members 10.

The spring seat 30 extends along the lower surface 13 and the outer surface 11 of each of the corresponding two opposite rear side members 10 and is coupled to the lower surface 13 and the outer surface 11. The spring seat 30 includes the spring mounting part 41 and the rib reinforcing part 51 which are integrally connected to each other.

The spring mounting part 41 includes the spring support surface 43, the one or more fastening ribs 45, and the spring fixing boss 47. Further, the rib reinforcing part 51 includes the fastening surface 53, the box rib 55, and the one or more inner ribs 57.

In a state in which the spring support surface 43 is in close contact with the lower surface 13 of each of the two opposite rear side members 10, the plurality of fastening ribs 45 are each fastened to the lower surface 13 of each of the two opposite rear side members 10 by the screws 61.

Further, the fastening surface 53 integrally connected to the spring support surface 43 is fastened to the outer surface 11 of each of the two opposite rear side members 10 by the one or more screws 61.

Further, the box rib 55 having the box space 56 is integrally provided on the fastening surface 53, and the one or more inner ribs 57 are integrally formed in the box space 56.

Furthermore, the outer reinforcing member 70 including the rib coupling portion 71 and the one or more reinforcing protrusion portions 73 is coupled to the outer surface of each of the wheelhouse panels 3 and coupled to the outer surface 11 of each of the two opposite rear side members 10. The rib coupling portion 71 is coupled to the box rib 55 of the rib reinforcing part 51.

The rear suspension (not illustrated) is mounted on the rear vehicle body structure 100 according to the embodiment of the present disclosure, which is assembled as described above, and the suspension spring 1 of the rear suspension is fixed to the spring fixing boss 47 of the spring mounting part 41.

Therefore, the rear vehicle body structure 100 according to the embodiment of the present disclosure may support and absorb the upward and downward loads, which are inputted through the suspension spring 1, through the spring mounting part 41 and radially disperse the upward and downward loads to the two opposite rear side members 10.

Further, the rear vehicle body structure 100 according to the embodiment of the present disclosure may transmit the upward and downward loads to the wheelhouse panels 3 through multiple load paths LP formed by the spring mounting part 41 and the rib reinforcing part 51.

In this case, the spring mounting part 41 and the rib reinforcing part 51 may transmit the upward and downward loads to the wheelhouse panel 3 through the outer surface 11 of each of the two opposite rear side members 10.

The spring mounting part 41 and the rib reinforcing part 51 may transmit the upward and downward loads to the wheelhouse panel 3 through the vertical rib 15 of each of the two opposite rear side members 10 and the inner reinforcing member 80.

The spring mounting part 41 and the rib reinforcing part 51 may transmit the upward and downward loads to the wheelhouse panel 3 through the outer reinforcing member 70.

In this case, the rib reinforcing part 51 may disperse the upward and downward loads, which are transmitted to the box rib 55, to the wheelhouse panel 3 through the outer reinforcing member 70. The outer reinforcing member 70 may disperse the upward and downward loads to the wheelhouse panel 3 through the reinforcing protrusion portions 73 that branch off into the two portions from the rib coupling portion 71 coupled to the box rib 55. That is, the upward and downward loads may be dispersed to the wheelhouse panel 3 through the load path LP formed on each of the two reinforcing protrusion portions 73.

Therefore, the rear vehicle body structure 100 according to the embodiment of the present disclosure may effectively disperse the upward and downward loads, which are inputted through the suspension spring 1, through the spring seat 30 and easily transmit the upward and downward loads to the wheelhouse panel 3 through the multiple load paths LP.

Further, according to the rear vehicle body structure 100 according to the embodiment of the present disclosure, the spring seat 30 is made of an aluminum die-cast material, which makes it possible to reduce the weight and cost of the vehicle.

Furthermore, according to the rear vehicle body structure 100 according to the embodiment of the present disclosure, the spring seat 30 does not require separate connection components to reinforce the structure thereof, which makes it possible to reduce the number of components and reduce the weight and cost of the vehicle body.

While the exemplary embodiments of the present disclosure have been described, the present disclosure is not limited to the embodiments. The present disclosure covers all modifications that can be easily made from the embodiments of the present disclosure by those skilled in the art and considered as being equivalent to the present disclosure.

What is claimed is:

1. A rear vehicle body structure comprising:
   two opposite rear side members to which wheelhouse panels are respectively coupled; and
   spring seats positioned respectively at lower sides of the two opposite rear side members,
   wherein the two opposite rear side members each comprise one or more vertical ribs disposed in each of the two opposite rear side members in a longitudinal direction, and
   wherein the spring seat coupled to a respective one of the two opposite rear side members includes a spring mounting part directly located below the respective one of the two opposite rear side members to correspond to a position where the vertical rib of the respective one of the two opposite rear side members is located.

2. The rear vehicle body structure of claim 1, wherein: the spring seat includes an aluminum die-cast member.

3. The rear vehicle body structure of claim 1, wherein: the spring seat coupled to the respective one of the two opposite rear side members comprises:
   the spring mounting part coupled to a lower surface of the respective one of the two opposite rear side members; and
   a rib reinforcing part coupled to an outer surface of the respective one of the two opposite rear side members.

4. The rear vehicle body structure of claim 3, wherein: the spring mounting part comprises:
   a spring support surface configured to be in close contact with the lower surface of the respective one of the two opposite rear side members; and
   one or more fastening ribs extending outward from an edge of the spring support surface and fastened to the lower surface of the respective one of the two opposite rear side members.

5. The rear vehicle body structure of claim 4, wherein: the fastening rib is provided in plural, and
   the plurality of fastening ribs is disposed radially at the edge of the spring support surface.

6. The rear vehicle body structure of claim 4, wherein: the spring mounting part further comprises
   a spring fixing boss having a conical shape and disposed at a lower side of the spring support surface.

7. The rear vehicle body structure of claim 3, wherein: the rib reinforcing part comprises:
   a fastening surface coupled to an outer surface of the respective one of the two opposite rear side members; and
   a box rib integrally connected to the fastening surface and having a box space opened at an upper end thereof.

8. The rear vehicle body structure of claim 7, wherein: the rib reinforcing part further comprises
   one or more inner ribs integrally connected to the box rib in the box space.

9. The rear vehicle body structure of claim 8, wherein: the one or more inner ribs each extend in a direction perpendicular to the fastening surface, are integrally connected to the box rib, and are disposed in an upward/downward direction.

10. The rear vehicle body structure of claim 1, further comprising:
    an outer reinforcing member connected to the spring seat and coupled to an outer surface of a respective one of the wheelhouse panels and an outer surface of the respective one of the two opposite rear side members.

11. The rear vehicle body structure of claim 10, further comprising:
    an inner reinforcing member configured to correspond to the outer reinforcing member and coupled to an inner surface of the respective one of the wheelhouse panels and an upper surface of the respective one of the two opposite rear side members.

12. The rear vehicle body structure of claim 11, wherein: the spring seat is configured to:
    transmit upward and downward loads to the respective one of the wheelhouse panels through the outer surface of the respective one of the two opposite rear side members;
    transmit the upward and downward loads to the respective one of the wheelhouse panels through the one or more vertical ribs and the inner reinforcing member; and
    transmit the upward and downward loads to the respective one of the wheelhouse panels through the outer reinforcing member.

13. The rear vehicle body structure of claim 7, wherein: the box rib is connected to an outer reinforcing member coupled to the outer surface of the respective one of the two opposite rear side members.

14. The rear vehicle body structure of claim 13, wherein:
the outer reinforcing member comprises:
    a rib coupling portion coupled to the box rib; and
    one or more reinforcing protrusion portions extending upward and downward from the rib coupling portion.

15. The rear vehicle body structure of claim 14, wherein:
the one or more reinforcing protrusion portions branch off into at least two portions from the rib coupling portion and are disposed in an upward/downward direction.

* * * * *